(12) United States Patent
Dieterle et al.

(10) Patent No.: US 10,100,715 B2
(45) Date of Patent: Oct. 16, 2018

(54) INTER COOLER

(71) Applicant: Mahle International GmbH, Stuttgart (DE)

(72) Inventors: Stefan Dieterle, Esslingen (DE); Thomas Strauss, Notzingen (DE); Christian Wagner, Stuttgart (DE)

(73) Assignee: Mahle International GmbH (DE)

( * ) Notice: Subject to any disclaimer, the term of this patent is extended or adjusted under 35 U.S.C. 154(b) by 104 days.

(21) Appl. No.: 15/159,472

(22) Filed: May 19, 2016

(65) Prior Publication Data

US 2017/0022886 A1    Jan. 26, 2017

(30) Foreign Application Priority Data

May 20, 2015    (DE) .................... 10 2015 209 209

(51) Int. Cl.
*F28F 17/00*    (2006.01)
*F02B 29/04*    (2006.01)
(Continued)

(52) U.S. Cl.
CPC ........ *F02B 29/0468* (2013.01); *F02B 29/045* (2013.01); *F02M 25/028* (2013.01); *F02M 25/0222* (2013.01); *F02M 25/0225* (2013.01); *F28F 17/005* (2013.01); *F28D 2021/0082* (2013.01); *F28F 9/14* (2013.01); *F28F 2230/00* (2013.01); *F28F 2275/08* (2013.01); *Y02T 10/121* (2013.01); *Y02T 10/146* (2013.01)

(58) Field of Classification Search
CPC ... F02B 29/0468; F02B 29/045; F28F 17/005; F28F 9/14; F28F 2275/08; F28F 2230/00; F02M 25/028; F02M 25/0222; F02M 25/0225; Y02T 10/146; Y02T 10/121; F28D 2021/0082
USPC ............................ 60/599; 123/540, 542, 563
See application file for complete search history.

(56) References Cited

U.S. PATENT DOCUMENTS 6,301,887 B1 * 10/2001 Gorel .................... F01N 3/0222
                                                    123/563
7,011,080 B2 *  3/2006 Kennedy ............. F02B 29/0418
                                                    123/568.12
(Continued)

FOREIGN PATENT DOCUMENTS

DE        3601391 A1    2/1987
DE       10234272 A1    2/2004
(Continued)

OTHER PUBLICATIONS

EP search report for EP-16169407.0 dated Jul. 14, 2016.
(Continued)

*Primary Examiner* — Hoang Nguyen
(74) *Attorney, Agent, or Firm* — Fishman Stewart PLLC

(57) ABSTRACT

An intercooler may include an air-outlet tank, a condensate collector for collecting condensate separated off the intercooler, and a condensate line connected to the condensate collector via an entrance and that opens out into the air-outlet tank via an exit. There may be a pressure difference between the entrance and the exit of the condensate line during operation of the intercooler, and said pressure difference may allow differential-pressure-induced discharge of condensate from the condensate collector via the condensate line.

19 Claims, 3 Drawing Sheets

(51) Int. Cl.
    *F02M 25/028* (2006.01)
    *F02M 25/022* (2006.01)
    *F28D 21/00* (2006.01)
    *F28F 9/14* (2006.01)

(56) References Cited

U.S. PATENT DOCUMENTS

| | | | |
|---|---|---|---|
| 7,980,076 B2 | 7/2011 | Buia et al. | |
| 8,783,233 B2 * | 7/2014 | Cockerill | F02M 35/10255 123/542 |
| 9,181,853 B2 * | 11/2015 | Leone | F02B 29/0468 |
| 2006/0021606 A1 * | 2/2006 | Bryant | F01L 1/053 123/562 |
| 2009/0223493 A1 | 9/2009 | Rutherford | |
| 2010/0229806 A1 * | 9/2010 | Kemeny | F02B 33/22 123/2 |
| 2010/0300647 A1 | 12/2010 | Steurer et al. | |
| 2011/0107760 A1 | 5/2011 | Quinn et al. | |
| 2016/0341107 A1 * | 11/2016 | Dieterle | B01D 53/261 |

FOREIGN PATENT DOCUMENTS

| | | |
|---|---|---|
| DE | 102009011634 A1 | 11/2009 |
| DE | 102009042981 A1 | 4/2010 |
| DE | 102008045685 A1 | 9/2010 |
| DE | 102009022986 A1 | 12/2010 |
| DE | 102012219796 A1 | 4/2014 |
| WO | WO-2015046182 A1 | 4/2015 |

OTHER PUBLICATIONS

English abstract for DE-102008045685.
English abstract for DE-10234272.
English abstract for DE-102012219796.
English abstract for DE-3601391.
German Search Report for DE-102015209209.7, dated Jan. 8, 2016.
European Search Report dated Sep. 18, 2017 for EP 16169407.0.

* cited by examiner

INTER COOLER

CROSS-REFERENCE TO RELATED APPLICATIONS

This application claims priority to German Patent Application No. 10 2015 209 209.7, filed May 20, 2015, the contents of which are hereby incorporated by reference in their entirety.

TECHNICAL FIELD

The present invention relates to an intercooler having an air-outlet tank and having a condensate collector for collecting condensate separated off in particular in the intercooler. The invention also relates to an internal combustion engine having such an intercooler.

BACKGROUND

DE 10 2009 042 981 A1 discloses an intercooler of the generic type having an air-inlet tank and an air-outlet tank and having a condensate collector for collecting condensate separated off in the intercooler. Also provided is a condensate line, which is connected to the condensate collector via an entrance and to an air-intake manifold via an exit. This is intended to give rise to differential-pressure-induced extraction of condensate from the condensate collector during operation of the intercooler, as a result of which it is possible to dispense with in particular hitherto used actuators, flaps or valves and/or control means.

DE 10 2009 011 634 A1, in turn, discloses an intercooler of the generic type in which a condensate line extracts condensate from the condensate collector continuously, as a reaction to a gradient generated by a throttle valve, as long as an engine is in the switched-on state.

DE 10 2008 045 685 A1 discloses an internal-combustion-engine arrangement having an internal combustion engine, a charge-air compressor, a low-pressure exhaust-gas-recirculation means, an intercooler and a charge-air line. Provision is made here for the intercooler to have, at the lowermost point of its air channel, a closable condensate-discharge opening, which is connected to the charge-air line via a condensate-discharge line. This is intended to make it possible to control discharge of condensate into the charge-air line.

In general, it may be the case, depending on environmental conditions (temperature and relative air humidity) and the prevailing operating conditions, that condensate occurs in the intercooler: on the one hand preferably at low load and low charge pressure and, on the other hand, in the case of low-pressure exhaust-gas recirculation. This may result in the charge-air-cooling operation being adversely affected, in particular at an ambient temperature below freezing, at which point the condensate collected can freeze. The passage of the charge air through the intercooler is partially blocked as a result. Much more critical, however, is the volume expansion of the water as it freezes, which may result in burst pipes in the intercooler. It is also possible for the internal combustion engine to be subjected to in some cases irreparable damage if all the condensate collected in its entirety enters suddenly into the internal combustion engine.

For this reason, the prior art discloses the practice of avoiding condensate in the intercooler or of discharging condensate from the intercooler, for which purpose for example actuator-operated opening flaps or valves are provided. Bypass lines around the intercooler are also known.

Additionally known from the prior art is the practice of extracting the condensate permanently, and without any additional actuators or flaps or valves being used, on account of a differential pressure between an air-intake manifold and a condensate collector on the intercooler.

The disadvantage with the solutions known from the prior art, however, is that either they are expensive and of complex design or they require a condensate line to be installed separately.

SUMMARY

The present invention therefore deals with the problem of specifying, for an intercooler of the type in question, an improved embodiment, or at least an alternative embodiment, which overcomes in particular the disadvantages which are known from the prior art.

This problem is solved according to the invention by the subject matter of the independent claims. Advantageous embodiments form the subject matter of the dependent claims.

The present invention is based on the general idea of equipping an intercooler with an air-outlet tank and with a heat-exchanger block, which is arranged therebetween and has a condensate collector which collects condensate separated off in particular in the intercooler, and, at the same time, providing a condensate line via which the condensate collected in the condensate collector can be delivered automatically, that is to say without any actuators or flaps or valves being used, into the air-outlet tank and can be fed from there to an internal combustion engine. In contrast to the prior art, therefore, there is no need for either an actuator or a flap/valve, nor is it necessary for the condensate line to be connected separately following installation of the intercooler. Rather, the intercooler forms a subassembly which can be fully preassembled and in the case of which, following connection to the charge-air path and the coolant circuit, there is no need for any further connection of a condensate line. The condensate line here is connected to the condensate collector via an entrance and to the air-outlet tank via an exit, wherein a pressure difference prevails between the entrance and the exit of the condensate line during operation of the intercooler, and said pressure difference allows differential-pressure-induced discharge of condensate from the condensate collector via the condensate line. The intercooler according to the invention, furthermore, has the great advantage that the condensate line, from the condensate collector to the air-outlet tank, is only comparatively short, which means that, in comparison with a condensate line which leads to an air-intake manifold, considerably less material is required, and costs can be reduced as a result. It is also highly advantageous in the case of the intercooler according to the invention that the difference in height between the exit and the entrance of the condensate line is considerably smaller than that of condensate lines known from the prior art, and this has a positive effect on the discharge of the condensate. In particular, the considerably reduced difference in height also means that only a considerably reduced pressure difference between the exit and the entrance of the condensate line is necessary in order for it to be possible for the condensate collected in the condensate collector to be discharged in a reliable manner. A further decisive advantage is that the condensate is fed at the narrowest point in the connector region of the air-outlet tank. It is here that the highest speed of the charge air, and therefore the lowest pressure, prevails. The pressure gradient is thus at a maximum, and therefore reliable transportation of the condensate is ensured.

The intercooler according to the invention therefore has the collecting and recirculating functions integrated in it (structural unit). This means that the intercooler has an integrated condensate collector, a condensate inflow into the condensate collector and a condensate-collecting means as well as recirculation of the condensate within the intercooler utilizing a pressure difference for the transportation of the condensate (Venturi principle).

In the case of an advantageous development of the solution according to the invention, the condensate collector is attached to the air-outlet tank, in particular by welding, brazing, adhesive bonding, screw-connection or clipping. Even this non-exhaustive list gives an idea of how many options there are available for fastening the condensate collector on the air-outlet tank, to be precise both by means of releasable connections and by means of non-releasable connections. Particularly attachment by screw-connection or clipping, furthermore, render maintenance and repair easier, since it is possible for the condensate collector to be straightforwardly released from the air-outlet tank and for example for a condensate discharge in the air-outlet tank to be cleaned. The air-outlet tank here may be designed in the form of a diffuser.

As an alternative to this, it is, of course, also conceivable for the condensate collector to be integrated in the air-outlet tank and to form an integral constituent part of the condensate collector. This can be done, in particular, in the manner of a double floor beneath the air-outlet tank or the intercooler. The size of the condensate collector here depends primarily on the quantity of condensate expected. Integrating the condensate collector in the air-outlet tank makes it possible for installation of the condensate collector on the air-outlet tank to be dispensed with altogether, as a result of which these installation costs are done away with and the intercooler is more cost-effective to produce overall.

In the case of an advantageous development of the solution according to the invention, the exit of the condensate line projects into the air-outlet tank and in particular is even bent round in the flow direction of the charge air. As a result, the exit of the condensate line functions in the manner of a Venturi nozzle, which has the charge-air stream flowing around it and uses said charge-air stream to generate, at the exit of the condensate line, the negative pressure which is necessary for discharging the condensate. For this purpose, it is possible for the exit of the condensate line, said exit projecting into the air-outlet tank, not just to be designed in the form of a nozzle; rather, it may also have, for example, a diameter of 0.5 mm<d<10 mm, preferably even a diameter of d between 0.8 and 5 mm. The diameter selected likewise depends here on the flow conditions of the charge air in the air-outlet tank and on the quantity of condensate which is to be delivered.

In the case of a further advantageous embodiment of the solution according to the invention, a connector, via which the condensate line is attached, is provided on the air-outlet tank. In the same way, it is also possible for a connector, via which the condensate line is attached by way of its entrance, to be arranged on the condensate collector. Such a connector, which is usually integral with the air-outlet tank or the condensate collector, makes it possible for, for example, a condensate line designed in the form of a rubber hose to be straightforwardly plugged onto the respective connector, and this renders the installation of the condensate line comparatively straightforward.

In order for it to be possible for the condensate line to be arranged in as space-saving and compact a manner as possible, said condensate line may be guided, in addition, along a wall of the air-outlet tank. For this purpose, it is conceivable, for example, for clip elements, into which the condensate line is clipped, to be provided on the wall of the air-outlet tank.

As an alternative to this, and in accordance with a particularly preferred embodiment of the solution according to the invention, it is also possible for the condensate line to run in the wall of the air-outlet tank, that is to say to be integrated in the wall of the air-outlet tank. This can be achieved, for example, by appropriate shaping of the wall, as a result of which the intercooler according to the invention does not require any greater amount of installation space than previous intercoolers, but the hitherto necessary operation of installing the condensate line can be completely done away with. In this case, it is possible for the condensate line to be formed from the wall material of the air-outlet tank, for example from metal, although it is, of course, also possible for an externally routed condensate line to be formed in such a way. As an alternative, it is also, of course, possible for the condensate line to be formed from plastics material, in particular in the form of a rubber hose, as a result of which both cost-effective production and comparatively straightforward installation can be achieved.

Further important features and advantages of the invention can be gathered from the dependent claims, from the drawings and from the associated description of the figures with reference to the drawings.

Of course, the features mentioned above, and those which are yet to be explained hereinbelow, can be used not just in the combination specified in each case, but also in different combinations or on their own, without departing from the context of the present invention.

Preferred exemplary embodiments of the invention are illustrated in the drawings and will be explained in more detail in the following description, like reference signs relating to like or similar, or functionally identical, components.

DETAILED DESCRIPTION

Figure 1:
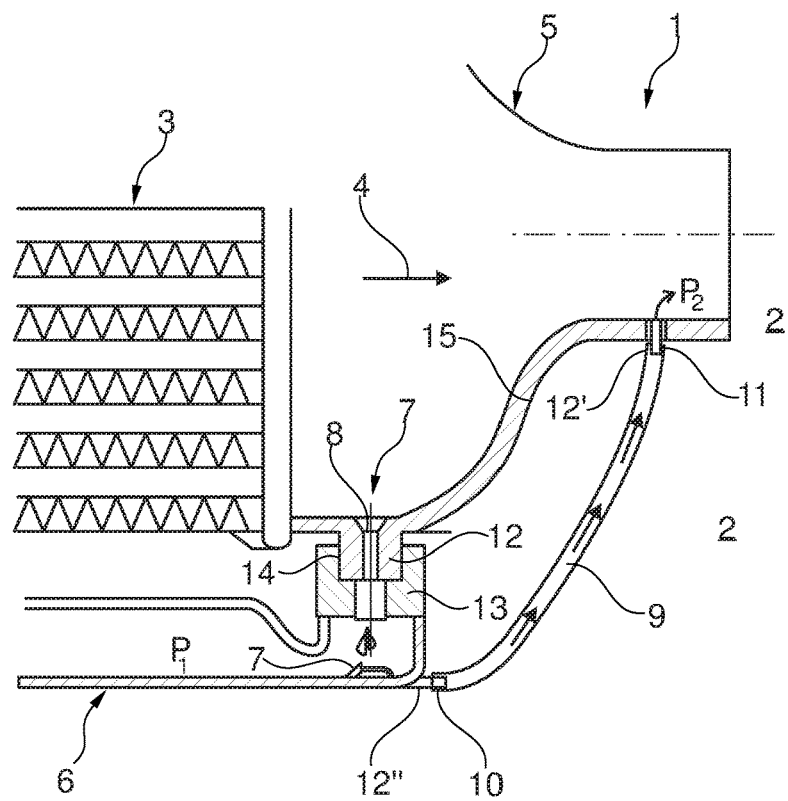
FIG. 1 shows a sectional illustration through an intercooler according to the invention in the region of an air-outlet tank and of a condensate line arranged there.

In correspondence with FIGS. 1 to 6, an intercooler 1 according to the invention of an internal combustion engine 2, which is otherwise merely indicated, has a heat-exchanger block 3, an air-inlet tank, which is not shown but is located upstream of the heat-exchanger block as seen in the flow direction 4, and an air-outlet tank 5. Also provided is a condensate collector 6 for collecting condensate 7 separated off in the intercooler 1. The condensate 7 here runs via a discharge opening 8, which is arranged in the floor of the air-outlet tank 5, into the condensate collector 6, which is arranged therebeneath. In order for it to be possible to discharge the condensate 7 collected in the condensate collector 6, a condensate line 9 is provided, said condensate line being connected to the condensate collector 6 via an entrance 10. The condensate line 9 opens out into the air-outlet tank 5 via an exit 11, wherein a pressure difference $p_1>p_2$ prevails between the entrance 10 and the exit 11 of the condensate line 9 during operation of the intercooler 1, and said pressure difference gives rise to differential-pressure-induced discharge of condensate from the condensate collector 6 via the condensate line 9 into the air-outlet tank 5. Arranging the exit 11 in the air-outlet tank 5, with the smaller cross-sectional surface area of the air-outlet tank 5 there than in the region of the heat-exchanger block 3, gives rise to a so-called Venturi effect, which extracts the condensate 7 from the condensate collector 6.

Looking at the intercooler 1 illustrated according to FIGS. 1 to 4, then it is possible to see that the condensate collector 6 is attached to the air-outlet tank 5, wherein the air-outlet tank 5 has, for example, a connector 12, on which the condensate collector 6 is plugged by way of a coupling 13. In order for it to be possible here to prevent condensate 7 from escaping in an undesirable manner, a seal 14 is provided between the connector 12 and the coupling 13. In addition, or as an alternative, it is also possible, of course, for the condensate collector 6 to be attached to the air-outlet tank 5 by welding, brazing, screw-connection, adhesive bonding or clipping, that is to say both by non-releasable connections and by releasable connections, wherein in particular the releasable connections have the great advantage that the condensate collector 6, in the case of maintenance and repair, can be removed from the intercooler 1, that is to say specifically from the air-outlet tank 5, and for example the discharge opening 8 can be cleaned. Of course, brazing the condensate collector 6 to the air-outlet tank 5 also has advantages since, in this case, the entire intercooler 1, that is to say along with the heat-exchanger block 3, air-outlet tank 5 and condensate collector 6, could be brazed jointly in a brazing furnace.

Figure 5:
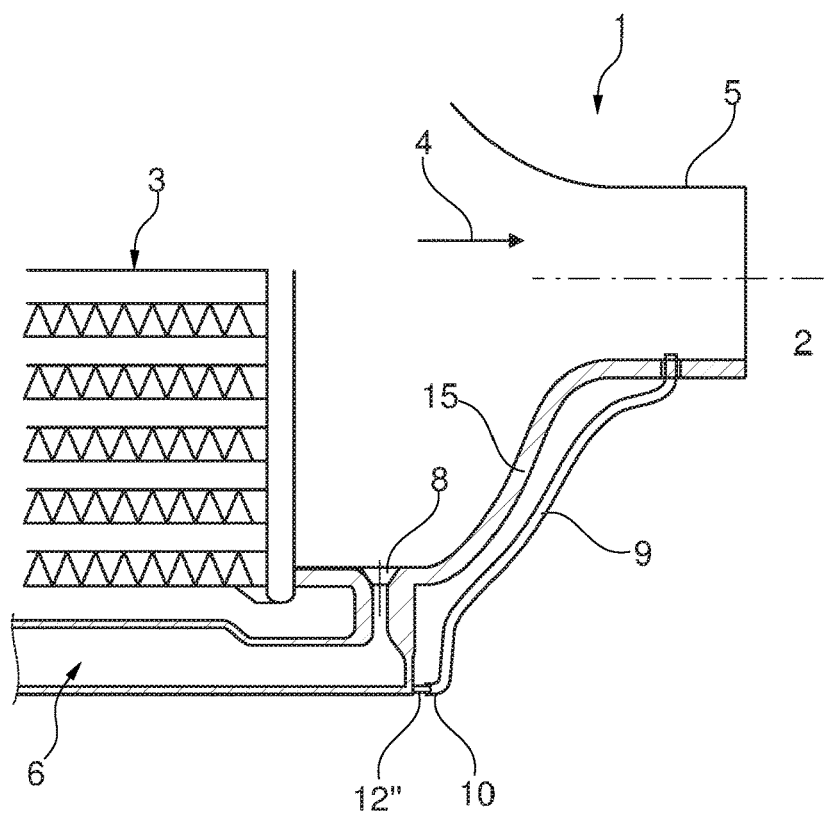
FIG. 5 shows an illustration as in FIG. 2, but with a condensate collector formed integrally on the intercooler.
Figure 6:
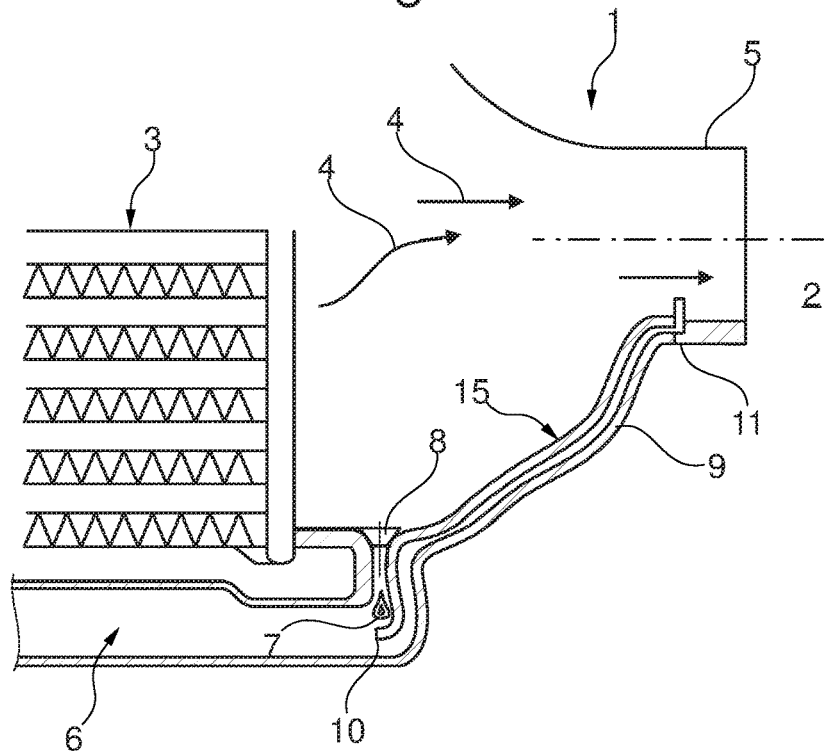
FIG. 6 shows an illustration as in FIG. 5, but with a condensate line running in the wall of the air-outlet tank.

In the case of the intercoolers shown according to FIGS. 5 and 6, in contrast, the condensate collector 6 is integrated in the air-outlet tank 5, that is to say it forms an integral constituent part of the same, in particular in the manner of a double floor.

Looking again at the intercooler 1 according to FIG. 1, then it is possible to see that the air-outlet tank 5 has a connector 12', via which the condensate line 9 is attached by way of its exit 11. In the same way, it is also possible for the condensate line 9 to be attached, by way of its entrance 10, via a connector 12" (cf. FIGS. 1 to 3 and 5) arranged on the condensate collector 6. In this case, the condensate line 9 does not project into the air-outlet tank 5 by way of its exit 11.

Figure 2:
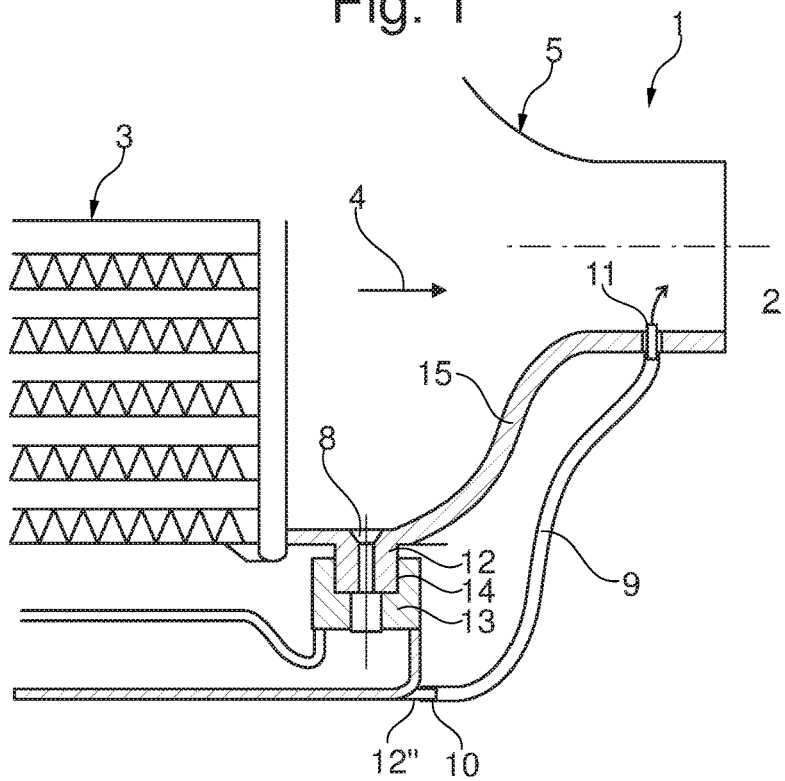
FIG. 2 shows an illustration as in FIG. 1, but with the condensate line opening differently into the air-outlet tank.
Figure 3:
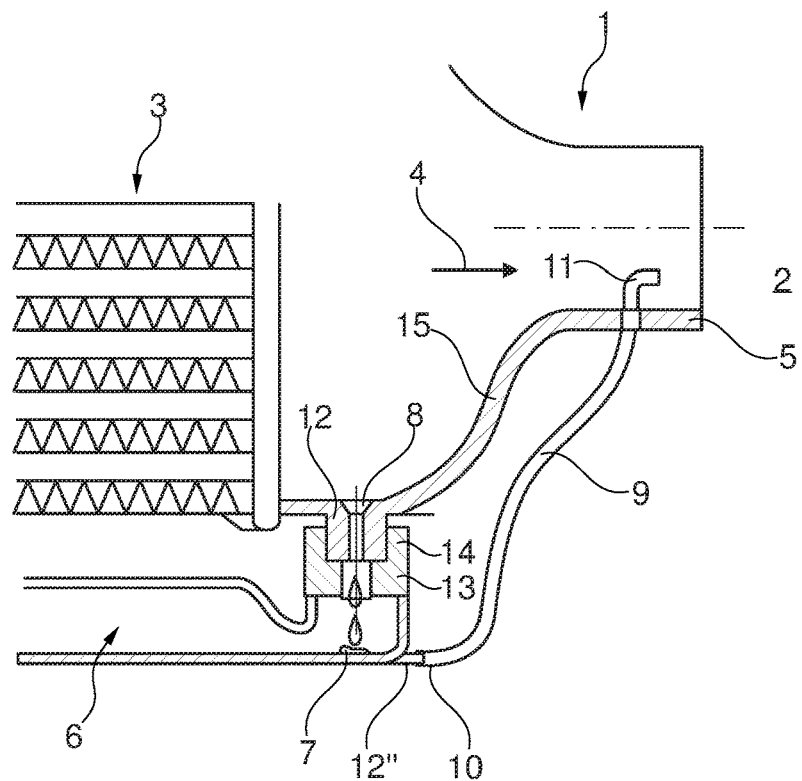
FIG. 3 shows an illustration as in FIG. 2, but with the condensate line exiting in a bent-round state in the air-outlet tank.

Looking at FIG. 2, then it is possible to see that the exit 11 of the condensate line 9 projects into the air-outlet tank 5 and, in particular as is illustrated according to FIG. 3, is bent round in the flow direction 4 of the charge air. It is possible here for the exit 11 of the condensate line 9, said exit projecting into the air-outlet tank 5, to be designed in the form of a nozzle and/or to have a diameter d between 0.5 and 10 mm, preferably a diameter d between 0.8 and 5.0 mm. It is also the case with the intercoolers 1 according to the rest of the figures that the condensate is extracted via the condensate line 9 on account of the so-called Venturi effect.

Figure 4:
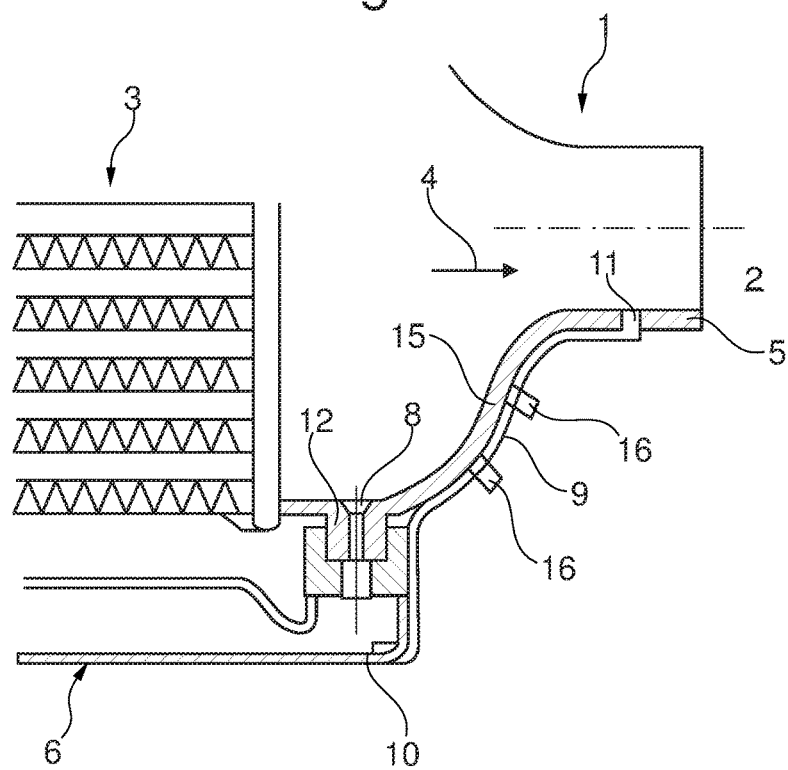
FIG. 4 shows the intercooler according to the invention with the condensate line running along a wall of the air-outlet tank.

Looking again, for example, at the intercooler 1 according to FIG. 4, then it is possible to see that the condensate line 9 runs along a wall 15 of the air-outlet tank 5 and is thus arranged in a compact manner. The condensate line 9 may be retained on the wall 15, for example, via clip elements 16, in particular if the condensate line 9 is formed from plastics material, for example in the form of a rubber hose. As an alternative, it is also possible, of course, to make provision for the condensate line 9 to be formed from metal, and therefore to be able to follow the progression of the wall 15 without any additional retaining means. Such an embodiment is illustrated, for example, according to FIG. 5.

Looking at the intercooler 1 according to FIG. 6, then it is possible to see that the condensate line 9 runs in the wall 15 of the air-outlet tank 5 and is thus integrated in the same. This constitutes a particularly compact solution of the arrangement of the condensate line 9, wherein the condensate line 9 in this case is arranged, at the same time, in a protected manner in the wall 15.

The intercooler 1 according to the invention gives rise to the following significant advantages over intercoolers known from the prior art:

effective condensate management (collection and recirculation) in a single component, that is to say in the intercooler 1, rather than any activation or regulation being necessary, functioning is independent on account of the Venturi effect, cost-effective, so there is no need for any additional actuators and flaps or valves, the condensate 7 fed can be straightforwardly metered, determined in respect of quantity and shaped via a diameter of the condensate line 9 or the exit 11 thereof.

In addition, the intercooler 1 according to the invention has the collecting and recirculating functions integrated in it (structural unit). This means that the intercooler 1 has the integrated condensate collector 6, a condensate inflow into the condensate collector 6 and a condensate-collecting means as well as recirculation of the condensate 7 within the intercooler 1 utilizing a pressure difference for the transportation of the condensate 7 (Venturi principle).

The invention claimed is:

1. An intercooler comprising:
    an air-outlet tank;
    a condensate collector for collecting condensate separated off in the intercooler, the condensate collector being releasably connected to the air outlet tank; and
    a condensate line connected to the condensate collector via an entrance and that opens out into the air-outlet tank via an exit;
    wherein there is a pressure difference between the entrance and the exit of the condensate line during operation of the intercooler, and said pressure difference allows differential-pressure-induced discharge of condensate from the condensate collector via the condensate line; and
    wherein the air-outlet tank includes a connector on which the condensate collector is plugged via a coupling.

2. An intercooler according to claim 1, wherein the condensate collector is attached to the air-outlet tank.

3. An intercooler according to claim 1, wherein the condensate collector is attached to the air-outlet tank by welding, brazing, adhesive bonding, screw-connection or clipping.

4. An intercooler according to claim 1, wherein the condensate collector forms an integral constituent part of the air-outlet tank.

5. An intercooler according to claim 1, wherein one of:
the exit of the condensate line projects into the air-outlet tank; or
the exit of the condensate line projects into the air-outlet tank and is bent round in a flow direction of charge air.

6. An intercooler according to claim 1, wherein at least one of:
the exit of the condensate line is designed in the form of a nozzle; and
the exit of the condensate line has a diameter between 0.5 mm and 10.0 mm.

7. An intercooler according to claim 1, further comprising a connector provided on the air-outlet tank, and via which the condensate line is attached to the air-outlet tank.

8. An intercooler according to claim 1, further comprising a connector provided on the condensate collector, and via which the condensate line is attached to the condensate collector.

9. An intercooler according to claim 1, wherein one of:
the condensate line runs in a wall of the air-outlet tank; or
the condensate line runs along a wall of the air-outlet tank.

10. An intercooler according to claim 1, wherein the condensate line is formed from one of metal or plastics material.

11. An internal combustion engine comprising an intercooler having:
an air-outlet tank;
a condensate collector for collecting condensate separated off in the intercooler, the condensate collector being releasably connected to the air outlet tank; and
a condensate line connected to the condensate collector via an entrance and that opens out into the air-outlet tank via an exit;
wherein there is a pressure difference between the entrance and the exit of the condensate line during operation of the intercooler, and said pressure difference allows differential-pressure-induced discharge of condensate from the condensate collector via the condensate line; and
wherein the air-outlet tank includes a connector on which the condensate collector is plugged via a coupling.

12. An internal combustion engine according to claim 11, wherein one of:
the exit of the condensate line projects into the air-outlet tank; or
the exit of the condensate line projects into the air-outlet tank and is bent round in a flow direction of charge air.

13. An internal combustion engine according to claim 11, further comprising a connector provided on the air-outlet tank, and via which the condensate line is attached to the air-outlet tank.

14. An internal combustion engine according to claim 11, further comprising a connector provided on the condensate collector, and via which the condensate line is attached to the condensate collector.

15. An internal combustion engine according to claim 11, wherein one of:
the condensate line runs in a wall of the air-outlet tank; or
the condensate line runs along a wall of the air-outlet tank.

16. An intercooler according to claim 6, wherein the exit of the condensate line has a diameter between 0.8 mm and 5.0 mm.

17. An intercooler according to claim 1, wherein the condensate line is a rubber hose.

18. An intercooler comprising:
an air-outlet tank;
a condensate collector for collecting condensate separated off in the intercooler, the condensate collector being releasably attached to the air-outlet tank; and
a condensate line connected to the condensate collector via an entrance and that opens out into the air-outlet tank via an exit, the exit projecting into the air-outlet tank;
wherein there is a pressure difference between the entrance and the exit of the condensate line during operation of the intercooler, and said pressure difference allows differential-pressure-induced discharge of condensate from the condensate collector via the condensate line; and
wherein the air-outlet tank includes a connector on which the condensate collector is plugged so as to be releasably connected via a coupling.

19. An intercooler according to claim 18, wherein the exit of the condensate line is bent round in a flow direction of charge air.

* * * * *